L. SCHOENBERG.
PLUMBERS' TRAPS.
No. 187,182. Patented Feb. 6, 1877.
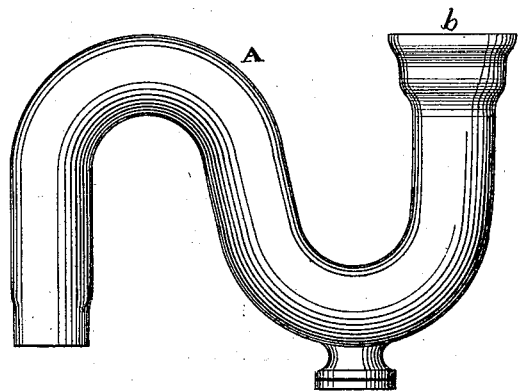
Witnesses
Geo. H. Strong
Alwyn T. Stacy
Inventor
Louis Schoenberg
By Dewey & Co.
Attys

UNITED STATES PATENT OFFICE.

LOUIS SCHOENBERG, OF SAN FRANCISCO, CALIFORNIA.

IMPROVEMENT IN PLUMBERS' TRAPS.

Specification forming part of Letters Patent No. 187,182, dated February 6, 1877; application filed January 2, 1877.

*To all whom it may concern:*

Be it known that I, LOUIS SCHOENBERG, of the city and county of San Francisco and State of California, have invented Improvements in Plumbers' Traps; and I do hereby declare the following to be a full, clear, and exact description thereof, reference being had to the accompanying drawings.

My invention relates to an improvement in waste-pipe traps for plumbers' use; and it consists in enlarging the pipe on one side of the S-bend, and reducing it in size on the opposite side.

The object of this construction is, first, to prevent siphoning; and, secondly, to avoid the formation of shoulders or projections on the inside of the pipe, all as hereinafter described.

Referring to the accompanying drawings, A represents the bend of an S-shaped trap, such as is used by plumbers for trapping waste-pipes. In constructing this trap I enlarge the inlet end of the trap where it connects with the upper or inlet pipe, as at $b$, and in joining the trap to the inlet-pipe I insert the end of the inlet-pipe into the enlarged end of the trap, thus obviating the formation of a ledge or shoulder in the pipe. The opposite or reduced end of the trap I insert into the end of the discharge-pipe, thus obtaining the same result in obviating the formation of a shoulder inside of the trap-pipe.

Ordinarily, the upper end of the trap-pipe is introduced into the lower end of the inlet-pipe, and the ledge thus formed catches and retains particles of matter, which become putrescent and emit an odor from the pipe, thus rendering the trap of no avail, because it is located below the joint. The enlarged size of the pipe or trap at this point, in connection with the reduced size of the opposite or lower end, will also prevent siphoning.

Having thus described my invention, what I claim, and desire to secure by Letters Patent, is—

The S-trap A, having its inlet end enlarged, and its outlet or discharge end reduced in size, with relation to the body of the trap, substantially as and for the purpose described.

In witness whereof I have hereunto set my hand and seal.

LOUIS SCHOENBERG. [L. S.]

Witnesses:
  GEO. H. STRONG,
  OLWYN T. STACY.